United States Patent
Eda et al.

(10) Patent No.: US 9,876,853 B2
(45) Date of Patent: Jan. 23, 2018

(54) STORLET WORKFLOW OPTIMIZATION LEVERAGING CLUSTERED FILE SYSTEM PLACEMENT OPTIMIZATION FEATURES

(71) Applicant: International Business Machines Corporation, Armonk, NY (US)

(72) Inventors: Sasikanth Eda, Vijayawada (IN); Deepak R. Ghuge, Sangamner (IN); Kaustubh I. Katruwar, Pune (IN); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 14/830,383

(22) Filed: Aug. 19, 2015

(65) Prior Publication Data
US 2017/0054796 A1 Feb. 23, 2017

(51) Int. Cl.
*H04L 29/08* (2006.01)
*G06F 9/50* (2006.01)

(52) U.S. Cl.
CPC ........ *H04L 67/1002* (2013.01); *G06F 9/5005* (2013.01); *G06F 9/5072* (2013.01);
(Continued)

(58) Field of Classification Search
CPC ......... G06F 17/30398; G06F 17/30427; G06F 17/30595; G06F 17/5045; G06F 9/4436;
(Continued)

(56) References Cited

U.S. PATENT DOCUMENTS 6,643,640 B1 11/2003 Getchius et al.
2003/0101307 A1* 5/2003 Gemelli .............. G06F 17/5045
710/305

(Continued)

FOREIGN PATENT DOCUMENTS

CN 104199912 A 12/2014

OTHER PUBLICATIONS

IBM, "GPFS File Placement Optimizer," General Parallel File System V4.1 Documentation, Last Updated Feb. 27, 2015, p. 1-6, IBM Knowledge Center, IBM Corporation, http://www-01.ibm.com/support/knowledgecenter/SSFKCN_4.1.0/com.ibm.cluster.gpfs.v4r1.gpfs200.doc/bl1adv_fposettings.htm?lang=en, Accessed on May 14, 2015.

(Continued)

*Primary Examiner* — Le H Luu
(74) *Attorney, Agent, or Firm* — Robert C. Bunker

(57) ABSTRACT

According to one exemplary embodiment, a method for embedded compute engine architecture optimization is provided. The method may include receiving an object. The method may also include determining a first category for the received object, whereby the determined first category is associated with a node. The method may then include storing the received object on the node associated with the determined first category. The method may further include receiving an algorithm. The method may also include determining a second category for the received algorithm, whereby the determined second category is associated with the node. The method may then include executing the received algorithm on the node, whereby the received algorithm uses the received object stored on the node.

20 Claims, 8 Drawing Sheets

(52) U.S. Cl.
CPC ...... *H04L 67/1014* (2013.01); *H04L 67/1097* (2013.01); *H04L 67/28* (2013.01)

(58) Field of Classification Search
CPC .... G06F 9/5044; G06F 9/5005; G06F 9/5072; H04L 67/1002; H04L 67/28; H04L 67/1097; H04L 67/1014
See application file for complete search history.

(56) References Cited

U.S. PATENT DOCUMENTS

| | | | |
|---|---|---|---|
| 2003/0221162 A1* | 11/2003 | Sridhar | G06F 17/30398 715/229 |
| 2006/0288345 A1* | 12/2006 | Rice | G06F 9/4436 718/1 |
| 2008/0098370 A1* | 4/2008 | Fontoura | G06F 17/30427 717/139 |
| 2009/0293022 A1 | 11/2009 | Fries | |
| 2013/0346615 A1 | 12/2013 | Gondi | |
| 2014/0068078 A1* | 3/2014 | Hiremane | G06F 9/5044 709/226 |
| 2014/0172867 A1 | 6/2014 | Lin et al. | |
| 2014/0297686 A1 | 10/2014 | Lee et al. | |
| 2014/0344312 A1* | 11/2014 | Yanacek | G06F 17/30595 707/804 |

OTHER PUBLICATIONS

Mell et al., "The NIST Definition of Cloud Computing," National Institute of Standards and Technology, Sep. 2011, p. 1-3, Special Publication 800-145.

* cited by examiner

| Category 402 | Computation Operation 404 | Storage Path 406 | FPO Node 408 |
|---|---|---|---|
| Encrypt | Algorithm1 | /storage/path1 | Storage_node8 |
| Cosmic processing | Algorithm3 | /storage/path3 | Storage_node11 |
| Mobile / Code render operations | Algorithm5 | /storage/path5 | Storage_node6 |
| JPG processing | No Algorithm match | /storage/path | Storage_node20 (can be any storage node based on resource availability) |
| PDF to TXT or TXT to PDF | Algorithm1 | /storage/path1 | Storage_node8 |

FIG. 4

STORLET WORKFLOW OPTIMIZATION LEVERAGING CLUSTERED FILE SYSTEM PLACEMENT OPTIMIZATION FEATURES

BACKGROUND

The present invention relates generally to the field of computing, and more particularly to compute engine embedded object storage.

Traditional object storage architecture includes two entities/node groups (i.e., proxy nodes and storage nodes). Proxy nodes are used for distributed load handling/request handling nodes into the namespace and storage nodes are responsible for writing into disks/storage subsystems. The storlet architecture is a software engine present within the nodes (e.g., proxy or storage nodes) having the end user determine the computation algorithm and deploy it or pass the engine as a standard object PUT operation.

SUMMARY

According to one exemplary embodiment, a method for embedded compute engine architecture optimization is provided. The method may include receiving an object. The method may also include determining a first category for the received object, whereby the determined first category is associated with a node. The method may then include storing the received object on the node associated with the determined first category. The method may further include receiving an algorithm. The method may also include determining a second category for the received algorithm, whereby the determined second category is associated with the node. The method may then include executing the received algorithm on the node, whereby the received algorithm uses the received object stored on the node.

According to another exemplary embodiment, a computer system for embedded compute engine architecture optimization is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving an object. The method may also include determining a first category for the received object, whereby the determined first category is associated with a node. The method may then include storing the received object on the node associated with the determined first category. The method may further include receiving an algorithm. The method may also include determining a second category for the received algorithm, whereby the determined second category is associated with the node. The method may then include executing the received algorithm on the node, whereby the received algorithm uses the received object stored on the node.

According to yet another exemplary embodiment, a computer program product for embedded compute engine architecture optimization is provided. The computer program product may include one or more computer-readable storage devices and program instructions stored on at least one of the one or more tangible storage devices, the program instructions executable by a processor. The computer program product may include program instructions to receive an object. The computer program product may also include program instructions to determine a first category for the received object, whereby the determined first category is associated with a node. The computer program product may then include program instructions to store the received object on the node associated with the determined first category. The computer program product may further include program instructions to receive an algorithm. The computer program product may also include program instructions to determine a second category for the received algorithm, whereby the determined second category is associated with the node. The computer program product may then include program instructions to execute the received algorithm on the node, whereby the received algorithm uses the received object stored on the node.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 4 illustrates an exemplary operations table according to at least one embodiment;

DETAILED DESCRIPTION

Figure 1:
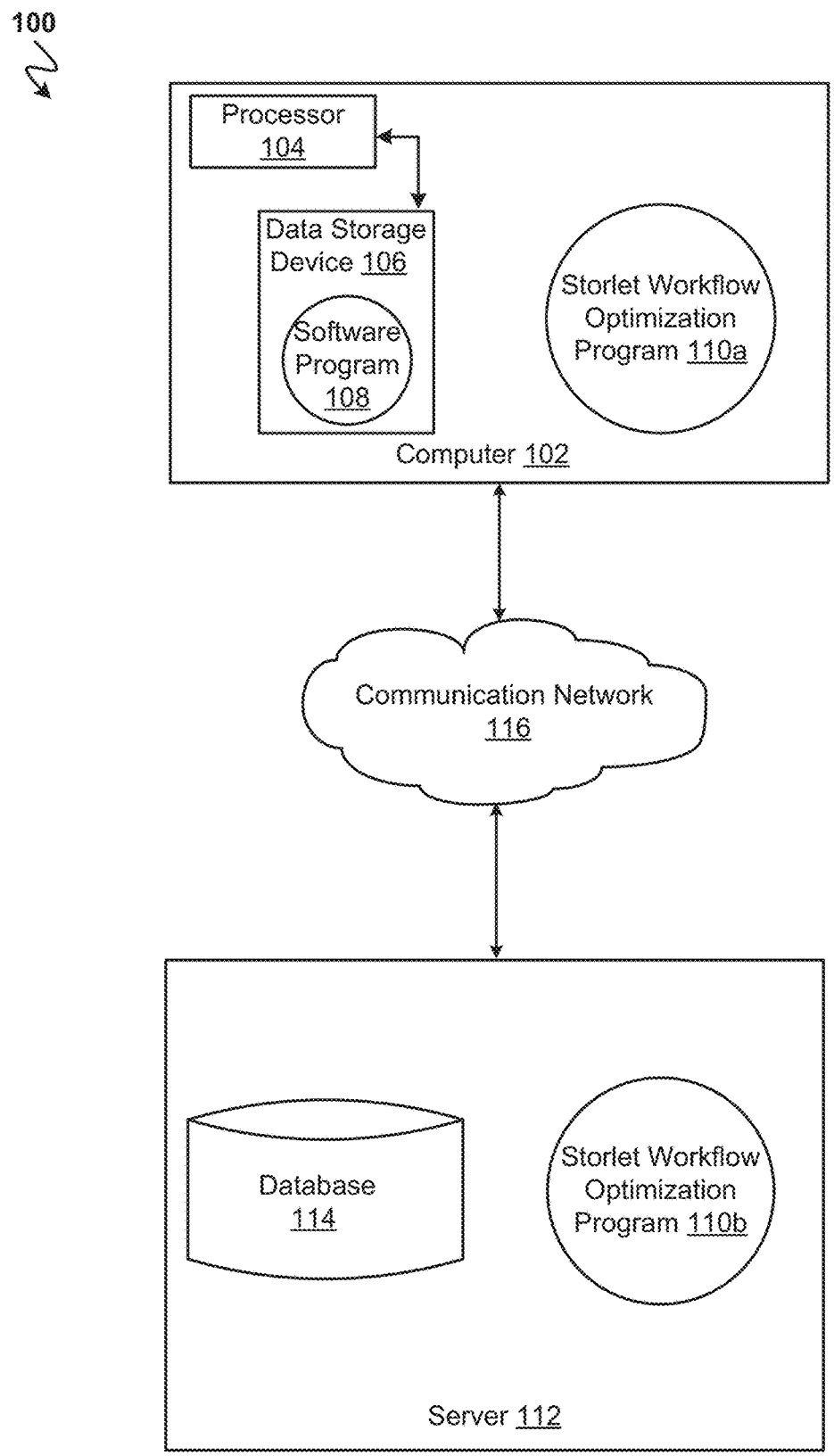
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for storlet (embedded compute engine within object storage) workflow optimization. As such, the present embodiment has the capacity to improve the technical field of embedded compute engine workflow optimization by leveraging file system placement optimization features of a clustered file system. More specifically, the embedded compute engine classifies an incoming object according to the requirements of pre-configured computation algorithm types. Next, based on the identified object class, the appropriate storage node/location is determined. The embedded engine may then be invoked on nodes based on the classification and respective storage paths configured using a share-nothing architecture.

As described previously, traditional object storage architecture includes two entities/node groups (i.e., proxy nodes and storage nodes). Proxy nodes are used for distributed load handling/request handling nodes into the namespace and storage nodes are responsible for writing into disks/storage subsystems. The storlet architecture (i.e., embedded compute engine architecture) is a software engine present within the nodes (e.g., proxy or storage nodes) having the end user determine the computation algorithm and deploy it or pass the engine as a standard object PUT operation. The storlet architecture may not require any additional client or compute node to perform analysis of data, the storage node/proxy nodes may act as the compute node and return generated results to the user. This architecture may use virtual machines deployed on the nodes in order to perform computational tasks.

File placement optimization features of a clustered file system are used to help maintain a single storage location for a file instead of striping the file across multiple storage disks. For example, the General Parallel File System (GPFS) File Placement Optimizer (FPO) offers a set of features that allows the GPFS to operate efficiently in a system based on a shared-nothing architecture (i.e., file striped to a single disk or node as opposed to striping the file to multiple disks or nodes).

In a clustered file system where data is striped across all the available disks and a user has supplied a computation algorithm, the computation algorithm execution may involve possessing (i.e., read/write) large datasets. In this scenario, the storlet engine first determines a storage node for container invocation (e.g., the algorithm for picking the node may be entirely random or may be dependent on the maximum available resources). Once a node is identified, a Docker container or virtualization unit is instantiated and when the container starts performing reading operation on a file, the file system pulls the blocks corresponding to the file from multiple disks located on multiple nodes and constructs the file at the file system layer in a container consumable format. The storlet engine may not have the intelligence to localize the object to a node especially in a clustered file system environment. Localization may depend on the type of computation algorithm used which requires the object category and middleware that helps the storlet engine to be invoked on a particular node where most of the objects required for executing the computation algorithm may be localized.

This operation may cause a significant increase in disk input/output (I/O) operations that may cause high loads on the file system and result in degradation of storage unit performance and reduced disk life span.

Therefore, it may be advantageous to, among other things, provide intelligent middleware that helps automatically place objects according to the classification of a computation algorithms meant for the system and invoking the storlet engine on the node according to the computation algorithm object locations.

According to at least one embodiment, computation is offloaded to storage hosting the clustered file system with the capability of file placement optimization. The method used to select the storage node from the storage cluster farm may result in overall optimization by the offloaded compute execution. An intelligent middleware may be integrated with the storlet's architecture to aid in determining the node to be used for executing a specified computation workload based on the maximum data availability (i.e., reduced I/O operations) required for completing execution of the respective compute algorithm. Features and flexibility necessary to implement the intelligent middleware may be added to traditional storlet architectures.

According to at least one embodiment, incoming objects are classified according to the requirements of the preconfigured computation algorithm types. This enables a framework to auto classify based on the content, metadata tags, owner, etc. the object or to classify through manual input.

For example, three computation algorithms may be provided and meant for storlet object storage unit deployed in a private or industry specific environment. The three computation types may be preprogrammed to the storage unit, whereas the dataset needed for the algorithms may vary. Algorithm 1 may be "computation_algorithm1={'create tar of customer related forms' }." Algorithm 2 may be "computation_algorithm2={'create excel of salary paid during Q1'}." Algorithm 3 may be "computation_algorithm3={'create pdf containing addresses of partners in South Asia' }." For every new incoming object, the middleware identifies the object's classification (i.e., which computation algorithm would potentially use this object in the future).

Then, based on the identified class of object, the appreciate storage node/location may be determined. For example, the storage path for algorithm 1 may be "customer_details (computation_algorithm1): /storage/path1."

Next, the storlet engine on the nodes may be invocated based on the classification and respective storage paths configured using a share-nothing architecture. Nodes may be used for storlet invocation based on the category of computation algorithm and the localization for servicing the computation algorithm. For example, for the deployed algorithm class {'create excel of salary paid during Q4' } would map to computation_algorithm2 and objects would be stored in storage_node10 using the path "/storage/path2" (i.e., all objects stored in this path are striped only on disks local to storage_node10).

Finally, if the incoming object does not fall under any classification of computation algorithm, it is stored in a storage path configured using a sharing mode architecture (i.e., the incoming object's blocks are striped across all disks available to the file system).

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a storlet workflow optimization program 110*a*. The networked computer environment 100 may also include a server 112 that is enabled to run a storlet workflow optimization program 110*b* that may interact with a database 114 and a communication network 116. The networked computer environment 100 may include a plurality of computers 102 and servers 112, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the storlet workflow optimization program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the storlet workflow optimization program 110a, 110b (respectively) to optimize storlet (i.e., embedded compute engine within object storage) engine workflow by leveraging the file system placement optimization features offered by clustered file systems. The storlet workflow optimization method is explained in more detail below with respect to FIGS. 2, 3, 4, and 5.

Figure 2:
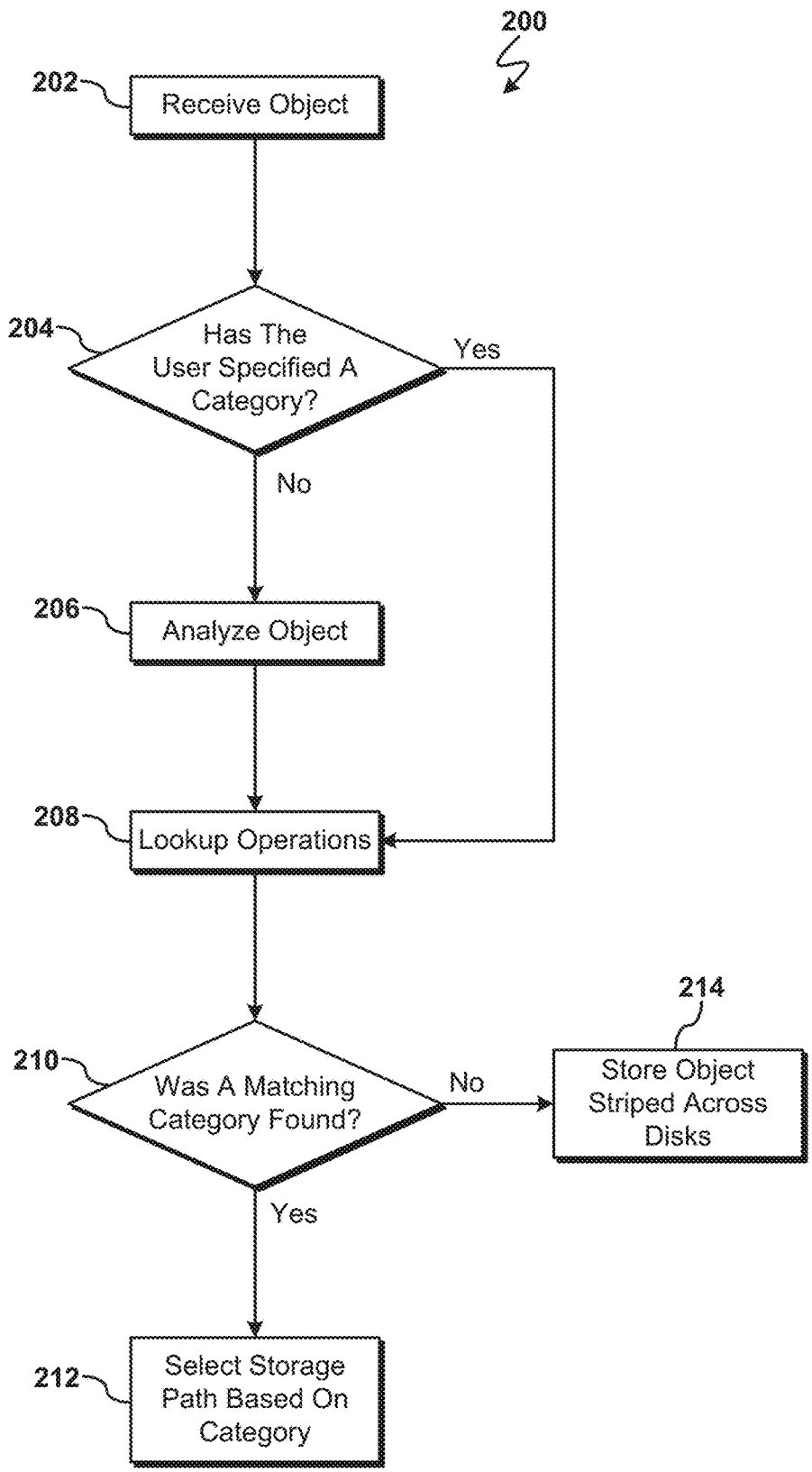
FIG. 2 is an operational flow chart illustrating a process for exemplary object placement according to at least one embodiment.

Referring now to FIG. 2, an operational flow chart illustrating the exemplary object placement process 200 by the storlet workflow optimization program 110a and 110b (FIG. 1) according to at least one embodiment is depicted.

At 202 an object is received to process. According to at least one embodiment, the received object may be a data file, such as a text file, spreadsheet, binary, or any other type of unstructured data. The received object may also include associated metadata, such as a user-specified category for the object. For example, a text file may be received that also has metadata associated with the text file indicating that a user has specified that the object should be categorized for encryption.

Next, at 204, it is determined if the received object has a user-specified category associated with the object. According to at least one embodiment, the received object may have associated metadata linked to the object. The metadata may be sent, for example, with as a text file having a string indicating the user-specified category (e.g., "category=encrypt"). The presence of metadata indicating a category specified by the user may be determined by the presence of extra data that may be designated as metadata (e.g., a string within the text file indicating the user-specified category).

If it is determined that the received object does not have a user-specified category associated with the object at 204, the received object is analyzed at 206 to determine the appropriate category for the received object. According to at least one embodiment, the received object may be analyzed for indicators regarding what type of data the object contains (e.g., image file, location data, payroll data, etc.) or the origin of the object (e.g., owner, department the object was created, etc.) or other indicators. Based on the type of data the object contains, or the object's origin, or other factors, a category may be determined for the object corresponding to the category that would most likely use the received object. A database (e.g., 114: FIG. 1) or other data structure may be used to store available categories along with what objects are most likely to be used with the category. For example a category for Java language compiling would most likely use Java source doe files having a ".java" file extension. Thus, if a received object has a ".java" file extension, the object may be categorized for Java language compiling. In another example, a text file may be received from a particular department that handles confidential data that must be encrypted. Therefore, the received text file from the particular department may be classified as being in the "encrypt" category.

However, if it is determined that the user has specified a category for the object at 204, or object analysis was completed at 206, category operations are looked up at 208 based on the category designated for the received object. According to at least one embodiment, category operations may be stored in table implemented, for example, using an array. The operations table may include entries identifying a category (e.g., encryption), a computation operation (e.g., encryption algorithm), storage path, and file optimization (FPO) node. For example, if the category determined for a received object is "encryption", the operations table may be searched for an entry with a category field that equals "encryption" or an equivalent identifier. Once the operations table (or other structure holding data regarding how objects of a category should be handled) is searched, if an entry corresponding to the received object's category was found, an indicator may be set, such as a flag. A more detailed example of an operations table is described below with reference to FIG. 4.

Then, at 210, it is determined if a matching category was found. According to at least one embodiment, the indicator (e.g., flag) set at 208 may be read to determine if a matching category was found in the operations table.

If a matching category was found at 210, the received object will be stored based on the storage path specified in the operations table entry corresponding to the object's category at 212. For example, if the operations table entry corresponding to the category of the object specifies a storage path "/storage/path1" and an FPO node of "Storage_node8", the object may not be striped across multiple storage nodes, and instead may be stored in the data repository (e.g., one or more hard disk drives) that makes up "Storage_node8." If the storage node is made up of more than one storage disk, the data may be striped across the two or more disks that make up the storage node.

However, if a matching category was not found in the operations table at 210, the received object will be stored based on the default behavior (e.g., stripe the blocks of data making up the object across all storage nodes) at 214.

Figure 3:
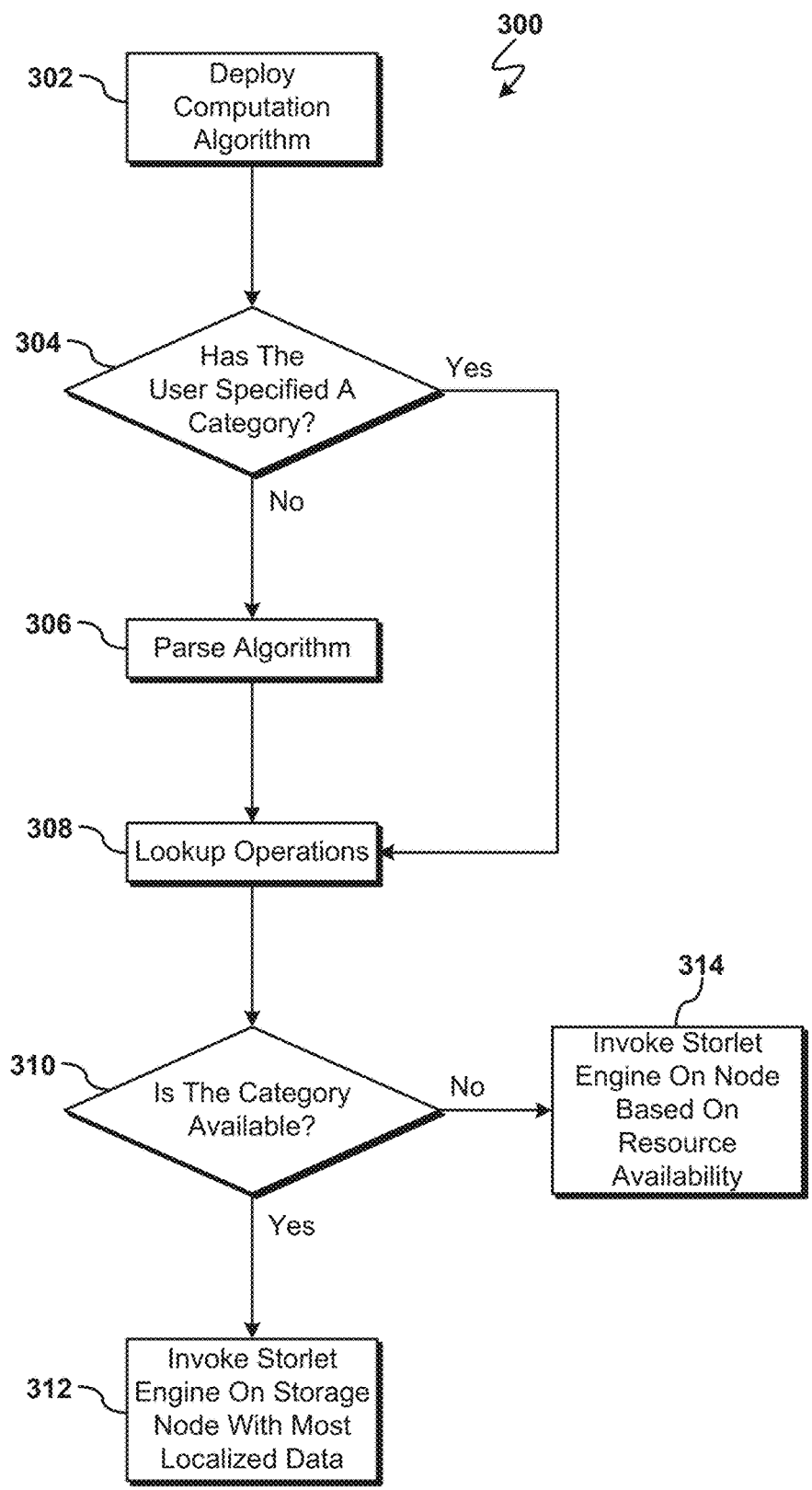
FIG. 3 is an operational flow chart illustrating a process for exemplary storlet invocation according to at least one embodiment.

Referring now to FIG. 3, an operational flow chart illustrating the exemplary storlet invocation process 300 by the storlet workflow optimization program 110a and 110b (FIG. 1) according to at least one embodiment is depicted.

At 302, a computation algorithm is deployed. According to at least one embodiment, a computation algorithm that interacts with data stored previously in file placement optimization (FPO) nodes may be deployed. The computation algorithm may be deployed in response to a user initiating the algorithm, automatically initiating due to a trigger event, etc. A computation algorithm may include algorithms to encrypt, compiling source code, processing image files, or any other data processing or computation algorithm. For example, a user may upload a computation algorithm to a proxy node in a storlet architecture indicating that a zip (i.e., a compressed file with a ".zip" file extension) file should be created by compressing ten files on storage node 10. The computational algorithm may be uploaded by the user as a text file that describes the task to be performed. The uploaded text file may be identified as a computational algorithm instead of other data using, for example, a predetermined file name, a predetermined character string within a text file, or some other way to indicate that the file is a computational algorithm instead of an object.

Next, at 304, it is determined if the received computational algorithm has a user-specified category associated with the computational algorithm. According to at least one embodiment, the received computational algorithm may have metadata associated with the computational algorithm specifying a user-defined category. For example, a string indicating the user-specified category (e.g., "category=zip") may be present within a text file containing the computational algorithm. A text string or other category indicator may be determined using known string parsing methods or other known methods.

If it is determined that there is no user-specified associated with the received computational algorithm at 304, the computational algorithm is parsed at 306. According to at least one embodiment, the computational algorithm may be parsed (e.g., using known string parsing methods) to determine the sequence of steps used by the algorithm along with the operations that may be required to execute each step. For example, if the received computational algorithm indicates that a zip file is to be created from ten text files, the first step may be to retrieve the ten files, next the zip compression algorithm may be executed using the ten text files as input, and the output zip file may be stored. The parsing results may then be used to determine the appropriate category for the received algorithm based on the steps and/or operations used by the computational algorithm.

However, if it is determined that the user has defined a category at 304, or algorithm parsing was executed at 306, category operations are looked up at 308 based on the category designated for the received computational algorithm. According to at least one embodiment, category operations may be stored in table implemented, for example, using an array. The operations table may include entries identifying a category (e.g., encryption), a computation operation (e.g., encryption algorithm), storage path, and file optimization (FPO) node. For example, if the category determined for a received object is "encryption", the operations table may be searched for an entry with a category field that equals "encryption" or an equivalent identifier. Once the operations table (or other structure holding data regarding how objects of a category should be handled) is searched, if an entry corresponding to the received object's category was found, an indicator may be set, such as a flag. A more detailed example of an operations table is described below with reference to FIG. 4.

Then, at 310, it is determined if a matching category was found. According to at least one embodiment, the indicator (e.g., flag) set at 308 may be read to determine if a matching category was found in the operations table.

If a matching category was found at 310, a storlet engine is invoked on the storage node with the most localized data at 312. According to at least one embodiment, the storlet engine may be invoked on the FPO node specified in the operations table. For example, if the operations table entry corresponding to the category of the computational algorithm indicates an FPO node of "Storage_node8", there is a high probability that the most of the data that will be used by the computational algorithm may be stored at "Storage_node8." Therefore, invoking the storlet engine on the same node that likely contains the most relevant data that may be used by the computational algorithm may minimize using resources that may otherwise be wasted retrieving large amounts of data to reassemble the object(s) from across multiple storage nodes.

However, if a matching category was not found in the operations table at 310, the received computational algorithm will be invoked on a node based on the default behavior (e.g., designating a node to invoke the storlet engine used to execute the computational algorithm based on a node's resource availability) at 314.

Referring now to FIG. 4, an exemplary operations table 400 according to at least one embodiment is depicted. The depicted example operations tablet 400 (i.e., template) includes data stored in a category column 402, a computation operation column 404, a storage path column 406, and a FPO node column 408.

The operations table 400 may be used by the object placement process 200 (FIG. 2) at 208 (FIG. 2) as described previously, for example, to find an entry corresponding to a user-specified category. When searching for a user-specified category, the category column 402 may be searched. If a matching category entry is found in the category column 402, data stored in the corresponding storage path column 406 and the FPO node column 408 may be read to determine where to store a received object as described previously at 212 (FIG. 2).

Similarly, the operations table may be used by the storlet invocation process 300 (FIG. 3) at 308 (FIG. 3) as described previously, to find an entry corresponding to a computational operation identified in a computational algorithm (e.g., 306: FIG. 3) that was uploaded by a user. The computational operation column 404 of the operations table 400 may be searched for an entry that matches a computational operation identified within the computational algorithm uploaded by the user. If a matching computational operation is found that is associated with a category in the operations table 400, the storlet engine may be invoked on the storage node specified in the operations table 400 using the FPO node column 408 information as described previously with respect to step 312 (FIG. 3).

Figure 5:
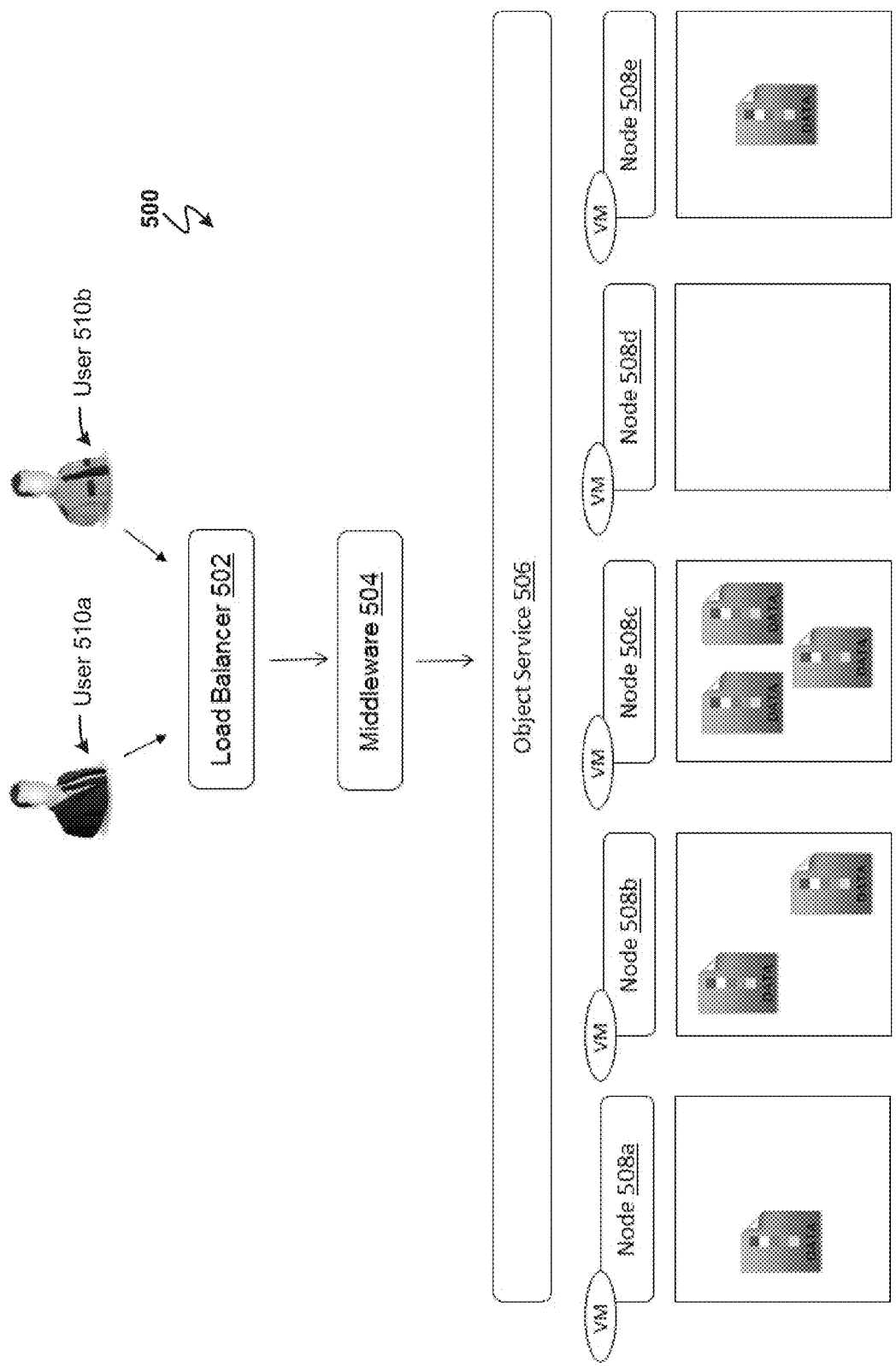
FIG. 5 is a system flow diagram illustrating an exemplary storlet system according to at least one embodiment.

Referring now to FIG. 5, a system flow diagram illustrating an exemplary storlet system 500 according to at least one embodiment is depicted.

As depicted, the storlet system 500 may include a load balancer 502, a middleware 504 running the storlet workflow optimization program 110a and 110b (FIG. 1), an object service 506, and storage nodes 508a-e.

Users 510a-b, interact with the storlet system 500 by uploading an object or computational algorithm as described previously. In the scenario when a user 510a-b uploads an object, the load balancer 502 receives the object and sends the object to a proxy node running middleware 504. The middleware 504 may then decide on which storage node 508a-e to store the object using the object placement process 200 (FIG. 2) as described previously. Once a storage node (e.g., 508c) has been chosen, a known object service 506 (e.g., Swift) may be used to store the object on the designated storage node (e.g., 508c).

In a scenario when a user 510a-b uploads a computational algorithm, the load balancer 502 receives the computational algorithm and sends the computational algorithm to a proxy node running middleware 504. The middleware 504 may then determine the storage node 508a-e that may have the most localized data to execute the computational algorithm using the storlet invocation process 300 (FIG. 3) as described previously. Once a storage node (e.g., 508*c*) has been chosen, the computational algorithm may execute on the storage node's (e.g., 508*c*) associated virtualization element (e.g., virtual machine (VM)).

It may be appreciated that FIGS. 2, 3, 4, and 5 provide only an illustration of one embodiment and does not imply any limitations with regard to how different embodiments may be implemented. Many modifications to the depicted embodiment(s) may be made based on design and implementation requirements.

Figure 6:
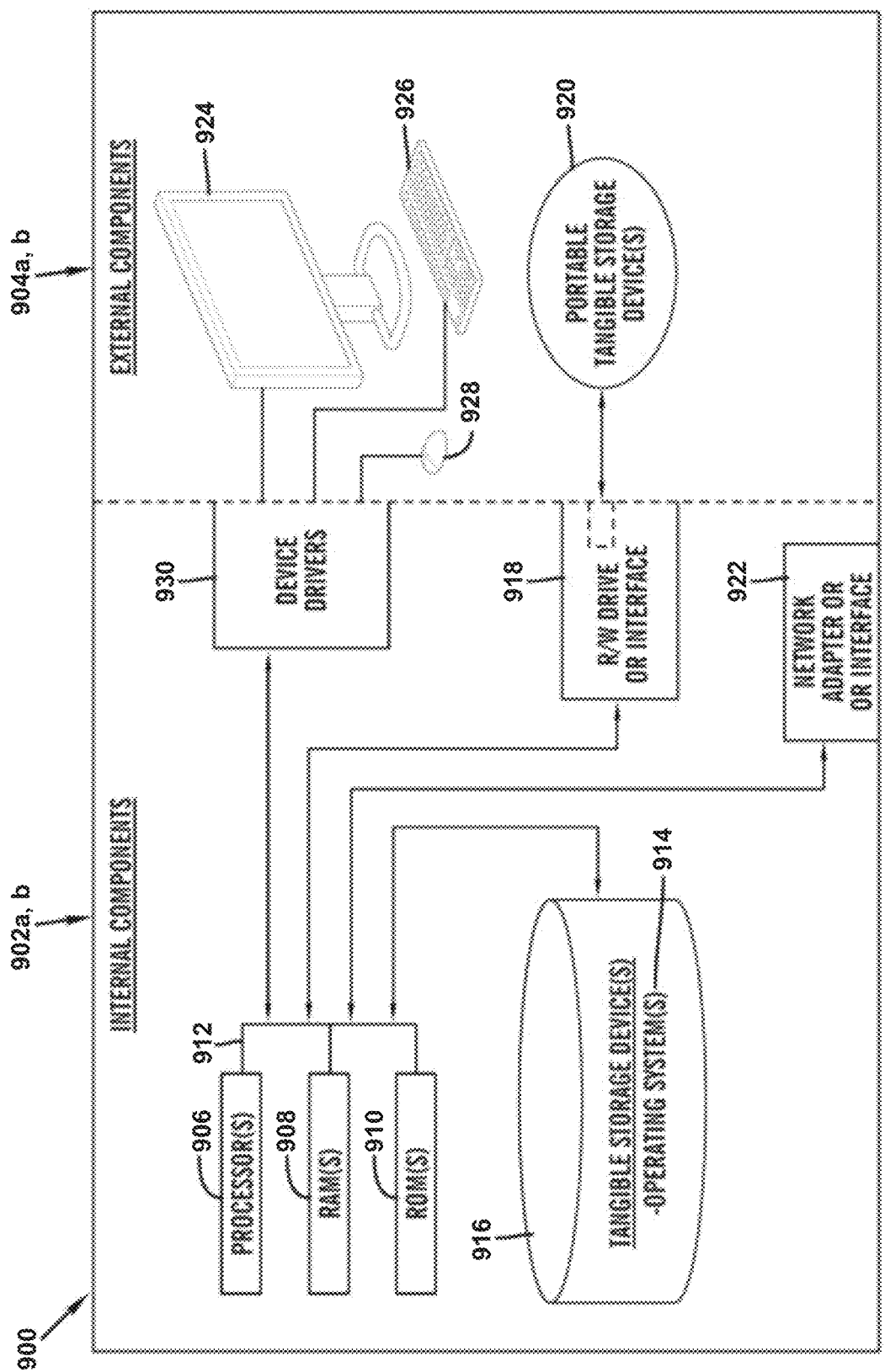
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 *a, b* and external components 904 *a, b* illustrated in FIG. 6. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the software program 108 (FIG. 1) and the storlet workflow optimization program 110*a* (FIG. 1) in client computer 102 (FIG. 1) and the storlet workflow optimization program 110*b* (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the storlet workflow optimization program 110*a* and 110*b* (FIG. 1) can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the storlet workflow optimization program 110*a* (FIG. 1) in client computer 102 (FIG. 1) and the storlet workflow optimization program 110*b* (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the storlet workflow optimization program 110*a* (FIG. 1) in client computer 102 (FIG. 1) and the storlet workflow optimization program 110*b* (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
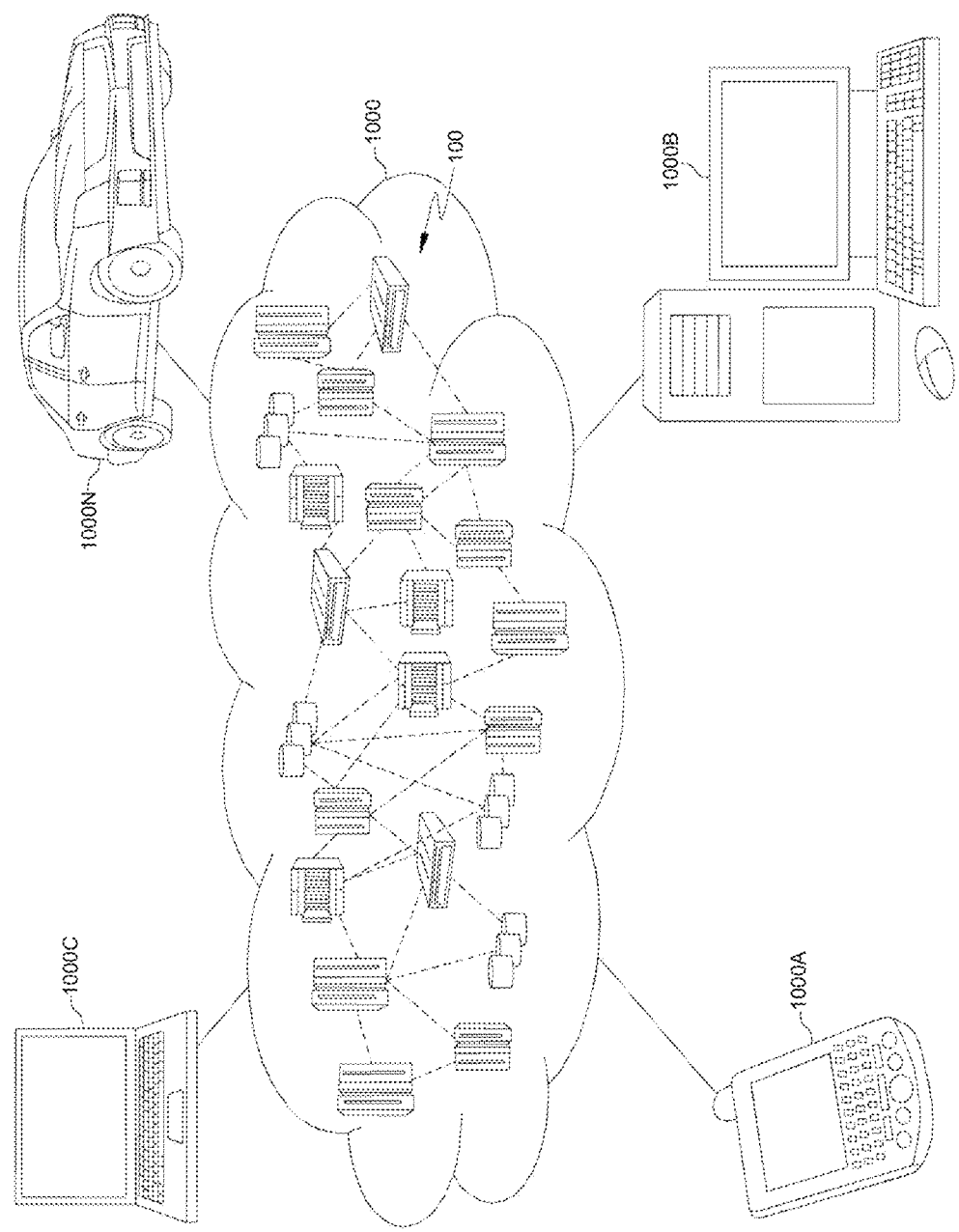
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
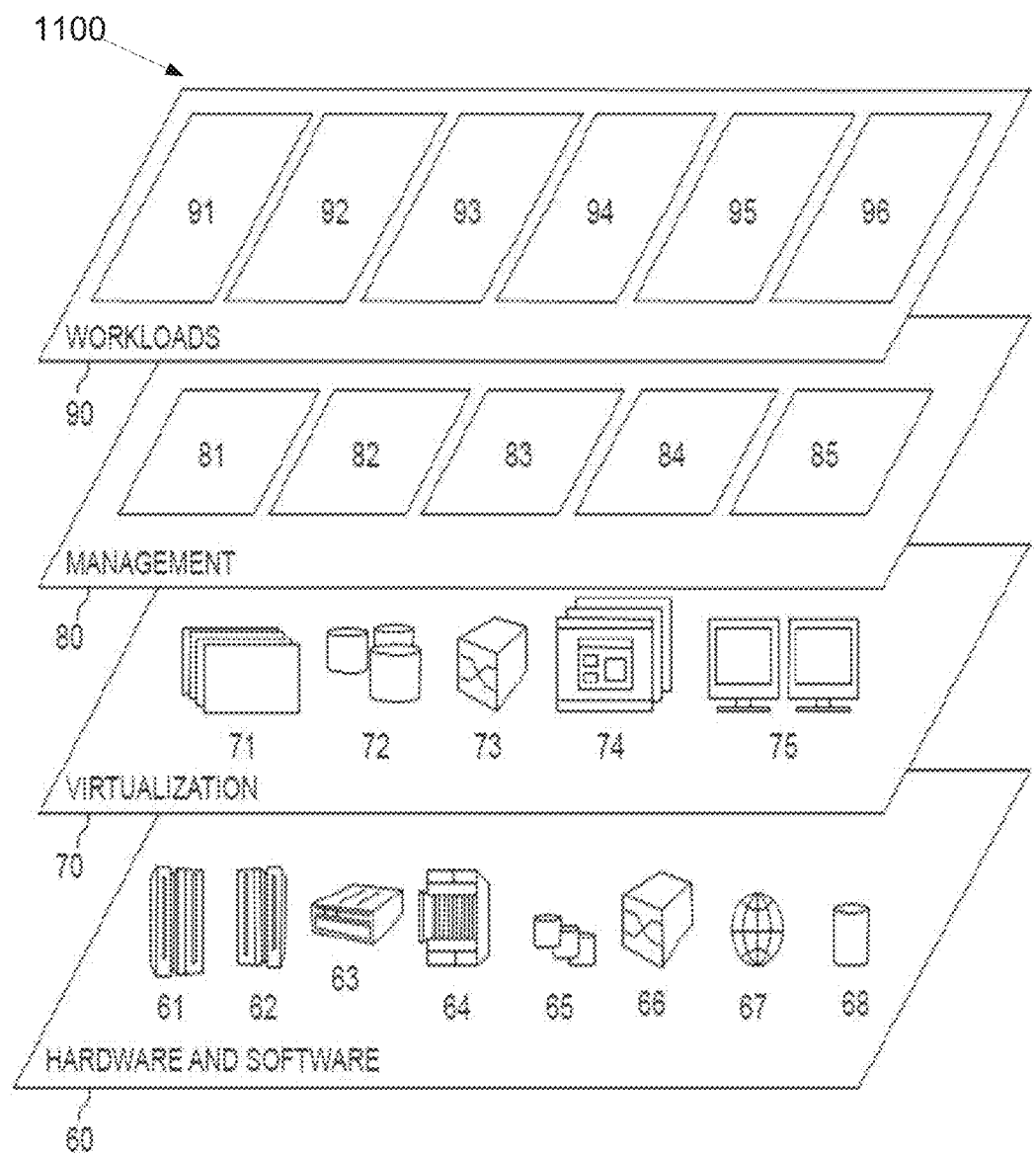
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized.

Examples of workloads and functions which may be provided from this layer include: mapping and navigation 91; software development and lifecycle management 92; virtual classroom education delivery 93; data analytics processing 94; transaction processing 95; and storlet workflow optimization 96. A storlet workflow optimization program 110a, 110b (FIG. 1) provides a way to optimize storlet workflow by leveraging the file system placement optimization features offered by clustered file systems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for embedded compute engine architecture optimization, the method comprising:
    receiving an object;
    determining a first category for the received object, wherein the determined first category is associated with a node;
    storing the received object on the node associated with the determined first category;
    receiving an algorithm;
    determining a second category for the received algorithm, wherein the determined second category is associated with the node; and
    executing the received algorithm on the node, wherein the received algorithm uses the received object stored on the node.

2. The method of claim 1, wherein determining the first category for the received object comprises analyzing the received object and searching an operations table for an entry corresponding to the received object, and wherein the corresponding entry within the operations table indicates the first category for the received object.

3. The method of claim 2, wherein determining the first category for the received object comprises selecting the node based on the entry within the operations table for the first category corresponding to the received object.

4. The method of claim 2, wherein the operations table comprises a plurality of entries, and wherein each entry within the plurality of entries includes a category value, a computational operation value, a storage path value, and a node value.

5. The method of claim 1, wherein determining the first category for the received object comprises identifying a user-specified category within metadata associated with the received object.

6. The method of claim 1, wherein determining the second category for the received algorithm comprises analyzing the received algorithm and searching an operations table for an entry corresponding to the received algorithm, and wherein the corresponding entry within the operations table indicates the second category for the received algorithm.

7. The method of claim 1, wherein executing the received algorithm on the node comprises a virtualization element associated with the node executing the received algorithm.

8. A computer system for embedded compute engine architecture optimization, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    receiving an object;
    determining a first category for the received object, wherein the determined first category is associated with a node;
    storing the received object on the node associated with the determined first category;
    receiving an algorithm;
    determining a second category for the received algorithm, wherein the determined second category is associated with the node; and
    executing the received algorithm on the node, wherein the received algorithm uses the received object stored on the node.

9. The computer system of claim 8, wherein determining the first category for the received object comprises analyzing the received object and searching an operations table for an entry corresponding to the received object, and wherein the corresponding entry within the operations table indicates the first category for the received object.

10. The computer system of claim 9, wherein determining the first category for the received object comprises selecting the node based on the entry within the operations table for the first category corresponding to the received object.

11. The computer system of claim 9, wherein the operations table comprises a plurality of entries, and wherein each entry within the plurality of entries includes a category value, a computational operation value, a storage path value, and a node value.

12. The computer system of claim 8, wherein determining the first category for the received object comprises identifying a user-specified category within metadata associated with the received object.

13. The computer system of claim 8, wherein determining the second category for the received algorithm comprises analyzing the received algorithm and searching an operations table for an entry corresponding to the received algorithm, and wherein the corresponding entry within the operations table indicates the second category for the received algorithm.

14. The computer system of claim 8, wherein executing the received algorithm on the node comprises a virtualization element associated with the node executing the received algorithm.

15. A computer program product for embedded compute engine architecture optimization, comprising:
    one or more non-transitory computer-readable storage media storing program instructions executable by a processor for embedded compute engine architecture optimization, the program instructions comprising:
    program instructions to receive an object;
    program instructions to determine a first category for the received object, wherein the determined first category is associated with a node;
    program instructions to store the received object on the node associated with the determined first category;
    program instructions to receive an algorithm;
    program instructions to determine a second category for the received algorithm, wherein the determined second category is associated with the node; and program instructions to execute the received algorithm on the node, wherein the received algorithm uses the received object stored on the node.

16. The computer program product of claim 15, wherein determining the first category for the received object comprises analyzing the received object and searching an operations table for an entry corresponding to the received object, and wherein the corresponding entry within the operations table indicates the first category for the received object.

17. The computer program product of claim 16, wherein determining the first category for the received object comprises selecting the node based on the entry within the operations table for the first category corresponding to the received object.

18. The computer program product of claim 15, wherein determining the first category for the received object comprises identifying a user-specified category within metadata associated with the received object.

19. The computer program product of claim 15, wherein determining the second category for the received algorithm comprises analyzing the received algorithm and searching an operations table for an entry corresponding to the received algorithm, and wherein the corresponding entry within the operations table indicates the second category for the received algorithm.

20. The computer program product of claim 15, wherein executing the received algorithm on the node comprises a virtualization element associated with the node executing the received algorithm.

* * * * *